United States Patent
Kikuchi et al.

(10) Patent No.: US 9,164,964 B2
(45) Date of Patent: Oct. 20, 2015

(54) CONTEXT-AWARE TEXT DOCUMENT ANALYSIS

(71) Applicant: International Business Machines Corporation, Armonk, NY (US)

(72) Inventors: Hiroaki Kikuchi, Yokohama (JP); Masaki Komedani, Yokohama (JP); Takuma Murakami, Tokyo (JP); Fumihiko Terui, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 225 days.

(21) Appl. No.: 13/742,473

(22) Filed: Jan. 16, 2013

(65) Prior Publication Data

US 2013/0218555 A1  Aug. 22, 2013

(30) Foreign Application Priority Data

Feb. 16, 2012 (JP) ................................. 2012-032067

(51) Int. Cl.
*G06F 17/21* (2006.01)
*G06F 17/27* (2006.01)

(52) U.S. Cl.
CPC .............. *G06F 17/21* (2013.01); *G06F 17/274* (2013.01); *G06F 17/278* (2013.01)

(58) Field of Classification Search
CPC .................................................. G06F 17/274
USPC ............................................................ 704/9
See application file for complete search history.

(56) References Cited

U.S. PATENT DOCUMENTS

| 5,748,953 | A  | * | 5/1998  | Mizutani et al. ...................... 1/1 |
| 6,546,401 | B1 | * | 4/2003  | Iizuka et al. .......................... 1/1 |
| 7,860,706 | B2 | * | 12/2010 | Abir ................................... 704/4 |

(Continued)

FOREIGN PATENT DOCUMENTS

| JP | 2003157271 | 5/2003 |
| JP | 2005115468 | 4/2005 |
| JP | 2006004098 | 1/2006 |
| JP | 2009110513 | 5/2009 |

OTHER PUBLICATIONS

K. Esaki et al., "Reputation classification based on appearance position of adjectives on the Weblog," Proceedings of the 67th National Convention of the IPSJ (2), Artificial Intelligence and Cognitive Science, Mar. 2, 2005, vol. 2, No. 5R-3, pp. 2-393 to 2-394, 6 pages.

(Continued)

*Primary Examiner* — Susan McFadden
(74) *Attorney, Agent, or Firm* — Cantor Colburn LLP (57) ABSTRACT

An analysis device for analyzing a text document is provided. The analysis device includes a context storage unit configured to store context information that shows a position of a character set of a predetermined context in the text document. The analysis device also includes an index storage unit configured to store index information that shows a position of a word in the text document, for each word of a plurality of words contained in the text document. An input unit is configured to input a target word. A position detection unit is configured to detect from the index information a position of the target word contained in the text document. A frequency detection unit is configured to detect an appearance frequency of the target word per each type of context in the text document based on the position of the target word and on the context information.

15 Claims, 7 Drawing Sheets

(56) References Cited

U.S. PATENT DOCUMENTS

| | | | |
|---|---|---|---|
| 8,818,789 B2* | 8/2014 | Abir | 704/2 |
| 8,874,431 B2* | 10/2014 | Abir | 704/9 |
| 8,880,392 B2* | 11/2014 | Abir | 704/10 |
| 8,949,109 B2* | 2/2015 | Hoshino et al. | 704/9 |

OTHER PUBLICATIONS

PCT/JP2013/050487 International Search Report with partial translation dated Mar. 26, 2013, 6 pages.

* cited by examiner

| Index | Contex | Document Number | Position |
|---|---|---|---|
| 001 | Affirmative | #001 | 1–14 |
| 002 | Negative | #002 | 31–45 |
| 003 | Affirmative | #003 | 46–59 |
| 004 | Japanese Language | #004 | 1–59 |
| ⋮ | ⋮ | ⋮ | ⋮ |

FIG. 5

| Index | Word | Document Number | Position |
|---|---|---|---|
| 001 | curry | #001 | 1–3, 50–52 |
| 002 | ramen | #001 | 18–21, 33–36 |
| 003 | delicious | #001 | 5–8 |

CONTEXT-AWARE TEXT DOCUMENT ANALYSIS

PRIORITY

The present application claims priority to Japanese Patent Application No. 2012-032067 filed on 16 Feb. 2012, and all the benefits accruing therefrom under 35 U.S.C. §119, the contents of which in its entirety are herein incorporated by reference.

BACKGROUND

This disclosure relates to text document analysis, and more particularly to an analysis device, an analysis method, and a computer program product that analyzes text documents.

Examples of analysis devices that analyze text documents are known. There are instances in which it is desirable to use a computer to seek with what frequency and in which sentence context (for example, of a particular nuance) a target word appears in a document. For example, with a document in which is written an appraisal of a restaurant, there are times when it is desirable to objectively judge a specific dish of the restaurant by investigating if the specific dish offered by the restaurant is included in a sentence of a certain context.

In such a situation, a computer first receives from a user a specification of the target dish name. The computer extracts from the target document all of the sentences that include the target dish name. Subsequently, the computer analyzes the context for each of the extracted sentences, and it detects whether each sentence is a sentence with an affirmative nuance context or is a sentence with a negative nuance context.

The computer then computes an occurrence frequency of sentences with an affirmative nuance context and an occurrence frequency of sentences with a negative nuance context, and it outputs the computed occurrence frequencies as values that express the reputation of the restaurant. However, with such processing, when the quantity of target documents is large, the analysis time becomes extended.

Additionally, there are times when, as a result of having investigated the reputation of a certain single dish of the restaurant, the user may also wish to investigate the reputation of another dish that is offered by the restaurant. In such a case, the computer must repeat the identical processing for the other dish. Accordingly, when investigating by specifying a plurality of words to be investigated, the computation cost of the computer becomes large.

SUMMARY

According to an embodiment, an analysis device for analyzing a text document is provided. The analysis device includes a context storage unit configured to store context information that shows a position of a character set of a predetermined context in the text document. The analysis device also includes an index storage unit configured to store index information that shows a position of a word in the text document, for each word of a plurality of words contained in the text document. An input unit is configured to input a target word. A position detection unit is configured to detect from the index information a position of the target word contained in the text document. A frequency detection unit is configured to detect an appearance frequency of the target word per each type of context in the text document based on the position of the target word and on the context information.

According to another embodiment, a computer-implemented method for analyzing a text document is provided. The method includes storing to a context storage unit, context information that shows a position of a character set of a predetermined context set in the text document. The method also includes storing in an index storage unit, index information that shows a position of a word in the text document, for each word of a plurality of words contained in the text document. A target word is input. A position of the target word contained in the text document is detected from the index information read from the index storage unit. An appearance frequency of the target word per each type of context in the text document is detected based on the position of the target word and on the context information from the context storage unit.

According to a further embodiment, a computer program product for analyzing a text document is provided. The computer program product includes a computer readable storage medium having computer readable program code embodied therewith. The computer readable program code includes computer readable program code configured for storing to a context storage unit, context information that shows a position of a character set of a predetermined context set in the text document. The computer readable program code is further configured for storing in an index storage unit, index information that shows a position of a word in the text document, for each word of a plurality of words contained in the text document. A target word is input. A position of the target word contained in the text document is detected from the index information read from the index storage unit. An appearance frequency of the target word per each type of context in the text document is detected based on the position of the target word and on the context information from the context storage unit.

The above summary of the invention is not an enumeration of all of the required features of the invention. Sub-combinations of these feature groups will result in the invention.

DETAILED DESCRIPTION

The following section describes embodiments, but the following embodiments do not limit the invention according to the claims. In addition, not all of the combinations of features explained with respect to the embodiments are essential to the solution means of this invention.

In exemplary embodiments, an analysis device analyzes a text document, providing a context storage unit for storing context information that shows the position of a character set for a predetermined context for the document, an index storage unit for storing index information that shows the position of a word in the document, for each word of the plurality of words contained in the document, an input unit for inputting a target word, a position detection unit for detecting from the index information the position of the target word contained in the document, and a frequency detection unit for detecting the appearance frequency of the target word per each type of context in the document, based on the positions of the target word and on the context information.

Figure 1:
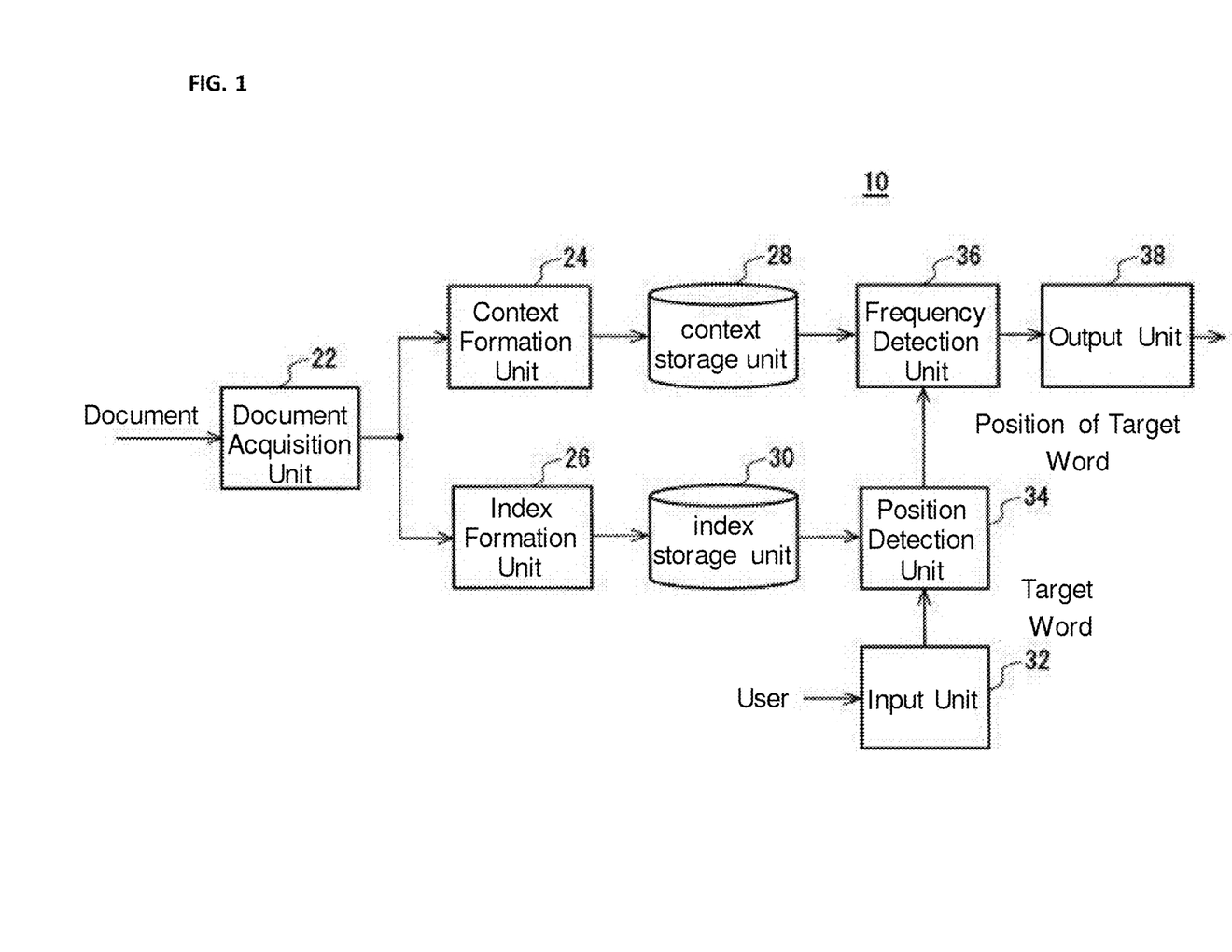
FIG. 1 shows the structure of an analysis device according to an embodiment.

FIG. 1 shows structure of an analysis device 10 according to an embodiment. Analysis device 10 analyzes a text document. Specifically, analysis device 10 analyzes the frequency with which a specified target word is included in a character set (sentence) of a predetermined context in a target document.

Analysis device 10 provides document acquisition unit 22, context formation unit 24, index formation unit 26, context storage unit 28, index storage unit 30, input unit 32, position detection unit 34, frequency detection unit 36, and output unit 38. Analysis device 10 is implemented by using a computer to execute a program.

Document acquisition unit 22 acquires a single text document or a plurality of text documents from an external source (a storage device external to analysis device 10 or a server on a network, for example). As an example, document acquisition unit 22 acquires a document that has been input by a user. Document acquisition unit 22 may also acquire a document by periodically accessing a server of a predetermined address.

Context formation unit 24 analyzes the single document or each of the plurality of documents acquired by document acquisition unit 22, and for those acquired documents, it forms context information that shows the positions of sentences having a predetermined context. Then, context formation unit 24 stores the formed context information in context storage unit 28.

Here, the context of a sentence refers to a characteristic that appears in the sentence. For example, the sentence context may express a nuance of the sentence, the line of thought, the language of the sentence, the content of the sentence, the writer of the sentence or the speaker of the sentence, or the time frame, place, background, or situation in which the sentence was recorded.

As an example, for each sentence, context formation unit 24 analyzes whether the sentence is of a context that expresses an affirmative nuance or the sentence is of a context that expresses a negative nuance. As another example, for each sentence, context formation unit 24 analyzes whether the sentence is of a context where the language is Japanese or the sentence is of a context where the language is English.

In another example, for each sentence, context formation unit 24 analyzes whether the sentence is of a context where the content is a question or the sentence is of a context where the content is an answer. With another example, for each sentence, context formation unit 24 analyzes whether the sentence is of a context where the writer or speaker is a certain person. As a result of having analyzed each sentence, in the event that context formation unit 24 has judged that a context for the sentence has appeared, it generates the context information and stores that information in context storage unit 28.

Furthermore, with this embodiment, a sentence is an organized character set that has an arrangement with in the document. For example, a sentence may be a character string from the character following a punctuation mark until the next punctuation mark, or it may be a paragraph within the document. In addition, a sentence need not be related to punctuation marks or paragraphs, but may be a character set of a line unit, a table data cell unit, or a character set within a unit region on a page surface.

Accordingly, when partitioning the text of a document by sentences, context formation unit 24 can partition with an algorithm. For example, context formation unit 24 can partition the content from the character following a punctuation mark until the next punctuation mark as a single sentence, or it can partition a paragraph as a single sentence. In additional examples, context formation unit 24 can partition a sentence by a line unit, a table data cell unit, or a unit region on a page surface.

Index formation unit 26 analyzes the document that has been acquired by document acquisition unit 22, and for each word of the plurality of words included in the document, it forms index information that shows the position of the word. Index formation unit 26 stores the generated index information in index storage unit 30.

Context storage unit 28 stores the context information formed by context formation unit 24. Index storage unit 30 stores the index information formed by index formation unit 26.

Input unit 32 inputs a target word according to an operation by such as a user. In addition to this, input unit 32 can input information that specifies a document to be analyzed. Furthermore, input unit 32 can input information that specifies a context to be analyzed.

In response to input of a target word by input unit 32, position detection unit 34 detects the position of the target word included in the document by searching for index information regarding the target word which is stored in index storage unit 30. Moreover, when input unit 32 has input information that specifies a document to be analyzed, position detection unit 34 detects the position of the target word included in the specified document by searching for index information regarding the target word for the specified document.

In response to input of the target word by input unit 32, frequency detection unit 36 detects the appearance frequency of the target word per each type of context in the document, based on the position of the target word and on the context information stored in context storage unit 28. Furthermore, when input unit 32 has input information that specifies a document to be analyzed, frequency detection unit 36 detects the appearance frequency of the target word per each type of context in the specified document. When input unit 32 has input information that specifies context to be analyzed, frequency detection unit 36 detects the appearance frequency of the target word only within the specified context.

Output unit 38 outputs the appearance frequency of the target word per each type of context detected by frequency detection unit 36. For example, output unit 38 displays on a screen the appearance frequency of the target word per each type of context.

Figure 2:
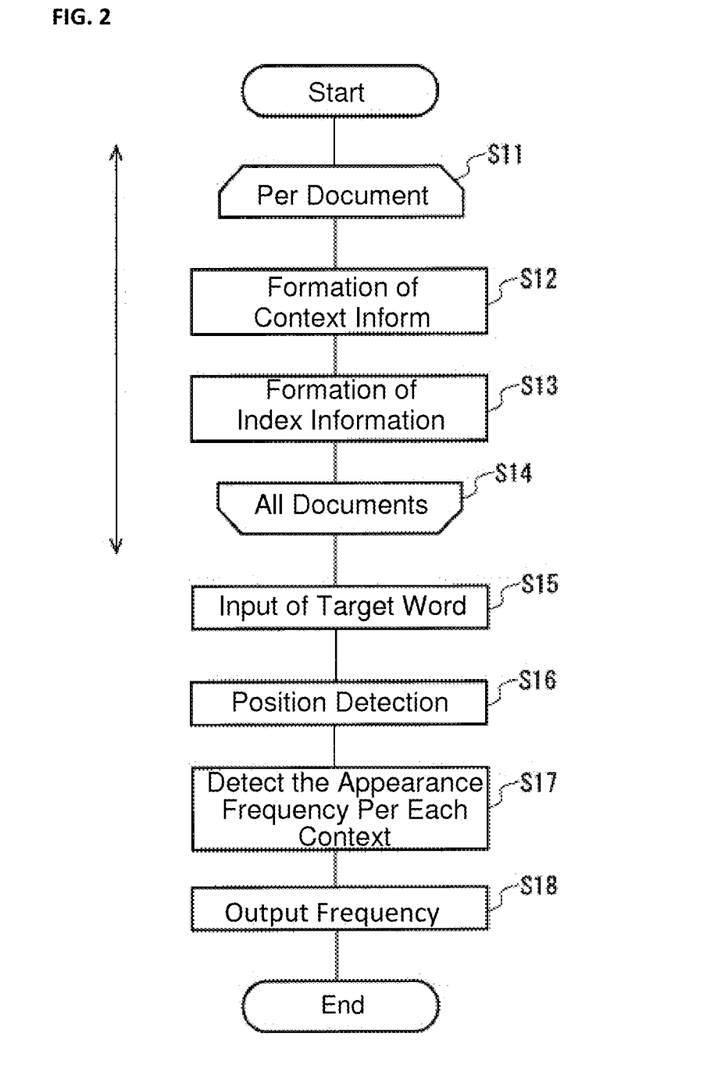
FIG. 2 shows a flowchart of processing used by an analysis device according to an embodiment.

FIG. 2 shows a flowchart of the processing by analysis device 10 according to the embodiment. Analysis device 10 repeatedly executes processing from block S12 to block S13 for each document acquired from the outside (loop processing from block S11 to block S14).

First, at block S12, context formation unit 24 analyzes the acquired document and forms context information for the acquired document. For example, context formation unit 24 partitions the text included in the document acquired by document acquisition unit 22 into sentences by a predetermined algorithm. Then, context formation unit 24 analyzes the context of a single sentence or of each of a plurality of sentences included in the document.

For example, for each of the plurality of sentences, context formation unit 24 judges whether or not there is included a specific word or phrase that characterizes an affirmative nuance, and thereby analyzes whether or not a sentence is of an affirmative nuance context. In addition, for each of the plurality of sentences, context formation unit 24 judges whether or not there is included a specific word or phrase that characterizes a negative nuance, and thereby analyzes whether or not a sentence is of a negative nuance context.

As another example, for each of the plurality of sentences, context formation unit 24 judges whether or not an included word is a word of the Japanese language, and thereby analyzes whether or not the sentence is of Japanese language context. In addition, for each of the plurality of sentences, context formation unit 24 judges whether or not an included word is a word of the English language, and thereby analyzes whether or not the sentence is of English language context.

As another example, for each of the plurality of sentences, context formation unit 24 judges whether or not there is included a word that characterizes a question, and thereby analyzes whether or not the content is in a sentence of question context. In addition, for each of the plurality of sentences, context formation unit 24 judges whether or not there is included a word that characterizes an answer, and thereby analyzes whether or not the content is in a sentence of answer context. In another example, for each of the plurality of sentences, context formation unit 24 references annexed information, and thereby analyzes whether or not the sentence is of a context that expresses that the writer or speaker is a certain person.

For a sentence which as a result of analysis has been judged to appear with a predetermined context, context formation unit 24 forms information that identifies the type of context as well as context information that expresses a position set for the sentence. For example, context formation unit 24 forms an identification number for identifying the context as well as a set comprising the initial character position and terminal character position of the sentence within the document. Then, context formation unit 24 stores the formed context information in context storage unit 28.

It is also acceptable for context formation unit 24 to judge whether a plurality of contexts apply to a single sentence. For example, context formation unit 24 can judge that a single sentence is of an affirmative nuance context and is of a Japanese language context.

Additionally, when context formation unit 24 partitions the text of a document to a plurality of sentences, it can partition by using positions that differ by the type of context. It is also acceptable for context formation unit 24 to form the context information for each of the plurality of sentences whose positions overlap with each other. For example, context formation unit 24 can analyze the nuance of the sentence by partitioning as a single sentence the content from the character following a punctuation mark to the next punctuation mark, and it can analyze the language of the sentence by partitioning as a single sentence the paragraph.

In continuation, at block S13, index formation unit 26 analyzes the acquired document and forms index information for each word of the plurality of words contained in the acquired document. As an example, index formation unit 26 detects all of the words included in a document acquired by document acquisition unit 22. Subsequently, as an example, for each detected word, index formation unit 26 detects at which characters of the sequence of characters within the text of the document the word appears. Further, as an example, for each of detected word, index formation unit 26 forms index information that expresses at which position within the document the word appears.

In comparison, when a target word is input by user operation, analysis device 10 advances the process consecutively from block S15 to block S18. First, at block S15, input unit 32 inputs the target word. Furthermore, input unit 32 inputs information that specifies the document to be analyzed as well as information that specifies the context to be analyzed.

In continuation, at block S16, position detection unit 34 detects the position of the target word within the document by referencing the index information formed at block S13. In this case, position detection unit 34 detects the position of the target word within the specified document by referencing the index information for the specified document.

At block S17, based on the position of the target word detected at block S16 and on the context information formed at block S12, frequency detection unit 36 detects the appearance frequency for the target word per each type of context in the document. More specifically, frequency detection unit 36 extracts all context information for the sentence that contains the target word by comparing the position information included in each item of context information formed at block S12 with the position of the target word detected at block S16.

Then, for each type of context, frequency detection unit 36 counts the quantity of extracted context information occurrences and makes the count value the appearance frequency for the target word. In this case, frequency detection unit 36 counts the context information occurrences per the context type for the document specified as a document to be analyzed.

For example, when a context with an affirmative nuance has been specified, frequency detection unit 36 counts the quantity of context information occurrences that are of affirmative nuance context. When a context with a negative nuance has been specified, frequency detection unit 36 counts the quantity of context information occurrences that are of negative nuance context.

In another example, when the context in which the language is Japanese has been specified, frequency detection unit 36 counts the quantity of context information occurrences that are of Japanese language context. When the context in which the language is English has been specified, frequency detection unit 36 counts the quantity of context information occurrences that are of English language context. Further, when a context for which the writer or speaker is a certain person has been specified, frequency detection unit 36 counts the quantity of context information occurrences that are of a context in which the writer or speaker is the certain person. Frequency detection unit 36 makes such a count value the frequency at which the target word appears in a sentence of the specified context.

In continuation, at block S18, output unit 38 outputs an appearance frequency for the target word per each type of context detected by block S17. As an example, output components 38 display on a screen the count results for each type of context within the extracted context information as the appearance frequency for the target word per each type of context.

As explained above, for each of the acquired documents, analysis device 10 according to this embodiment forms and stores in advance context information that shows the position of a sentence of a predetermined context. Then analysis device 10 uses the predetermined context information to execute analysis of the document.

In this way, by use of analysis device 10, in response to a target word having been input, there is ability to compute, within a short period of time, with what frequency and in which sentence context a target word appears. Furthermore, by use of analysis device 10, even when the target word has been repeatedly input, there is ability to compute, with minimal computing cost, with what frequency and in which sentence context a target word appears.

Figure 3:
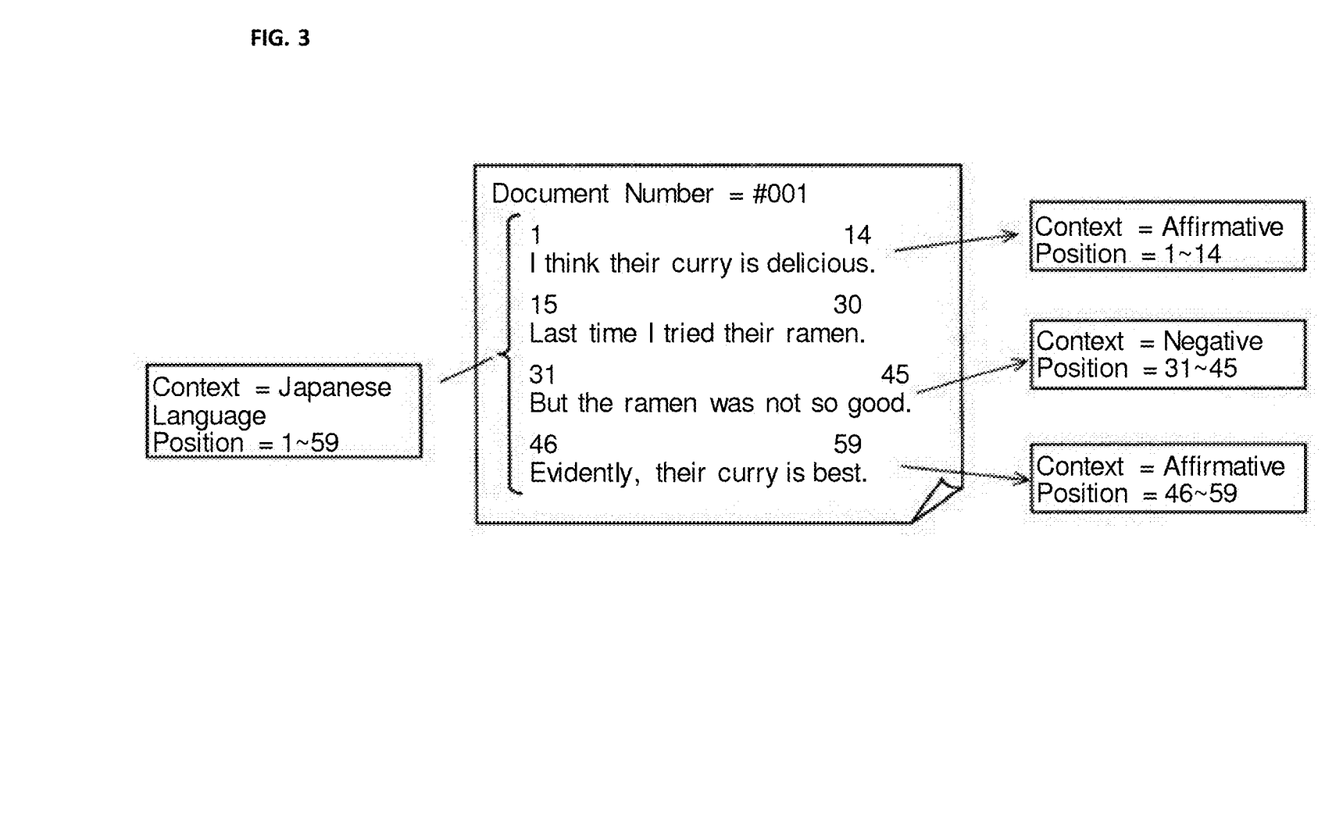
FIG. 3 shows an example of a document and an example of context information generated from the document.

FIG. 3 shows an example of a document and an example of the context information formed from that document. For example, as shown in FIG. 3, context formation unit 24 uses each punctuation mark to partition to sentences the text of the document (document number=#001). Then, for each sentence, context formation unit 24 analyzes whether the sentence is of an affirmative nuance or the sentence is of a negative nuance.

In the example of FIG. 3, the sentence on the first line ("I think their curry is delicious," in English translation) includes a characterizing word having an affirmative nuance. Accordingly, context formation unit 24 judges that the sentence of the first line is a sentence of an affirmative nuance context. In this case, in relation to the sentence of the first line, context formation unit 24 forms a set of context information which denotes the sentence is of an affirmative nuance context and includes position information showing the position of the first line (characters 1~14 of the equivalent Japanese).

In addition, the sentence of the second line ("Last time I tried their ramen," in English translation) does not include a characterizing word having an affirmative nuance and does not include a characterizing word having a negative nuance. Accordingly, context formation unit 24 does not judge the sentence of the second line to be a sentence of an affirmative nuance context nor to be a sentence of a negative nuance context. In this case, context formation unit 24 does not generate context information for the sentence of the second line.

The sentence of the third line ("But their ramen was not so good," in English translation) includes a characterizing word having a negative nuance. Accordingly, context formation unit 24 judges that the sentence of the third line is a sentence of a negative nuance context. In this case, for the sentence of the third line, context formation unit 24 forms a set of context information which denotes the sentence is of a negative nuance context and includes position information showing the position of the third line (characters 31~45 of the equivalent Japanese).

Furthermore, the sentence of the fourth line ("Evidently, their curry is best," in English translation) includes a characterizing word having an affirmative nuance, in the word "best." Accordingly, context formation unit 24 judges that the sentence of the 4th line is a sentence with an affirmative nuance context. In this case, for the sentence of the 4th line, context formation unit 24 forms a set of context information which denotes the sentence is of an affirmative nuance context and includes position information showing the position of the fourth line (characters 46~59 of the equivalent Japanese).

Then, as shown in FIG. 3, context formation unit 24 partitions the text of the document (document number=#001) into sentences per paragraph. For each sentence, context component 24 analyzes whether the language of the context is Japanese or English. The text of this document includes only one paragraph and all of the words are in the Japanese language. Accordingly, in this case, for the sentences of the first paragraph, context formation unit 24 forms a set of context information which denotes the context is in the Japanese language and includes position information showing the position of the first paragraph (characters 1~59 of the equivalent Japanese).

Figure 4:
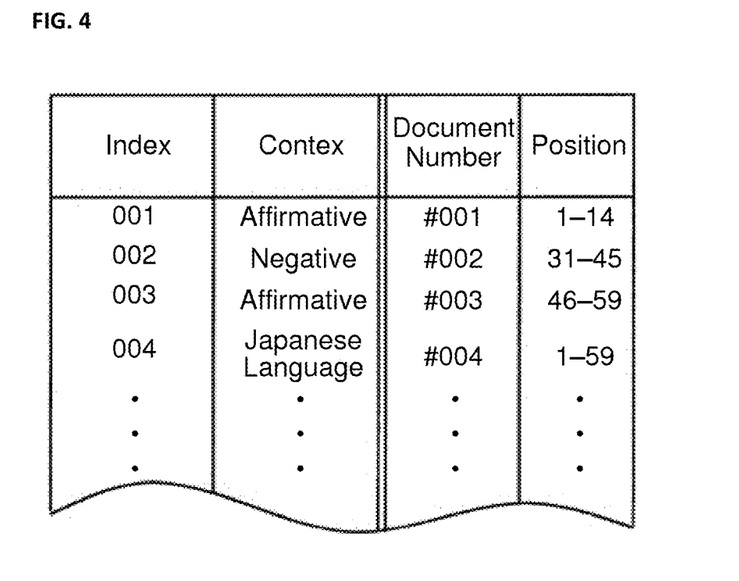
FIG. 4 shows an example of context information to be stored in a context storage unit according to an embodiment.

FIG. 4 shows an example of the context information that has been stored in context storage unit 28 according to an embodiment. Context storage unit 28 stores a plurality of context information that has been formed by context formation unit 24. For example, as the set of context information, context unit 28 stores an index number, the type of context, the document number for the document that includes the sentence, and the character positions of the sentence.

In the example of FIG. 4, context storage unit 28 stores, as context information for the item with index number 001, that the sentence is of an affirmative nuance context, that the document number is #001, and that the sentence is in the position of characters 1~14. In another example of FIG. 4, context storage unit 28 stores, as context information for the item with index number 002, that the sentence is of a negative nuance context, that the document number is #002, and that the sentence is in the position of characters 31~45.

In the example of FIG. 4, context storage unit 28 stores, as context information for the item with index number 003, that the sentence is of an affirmative nuance context, that the document number is number #001, and that the sentence is in the position of characters 46~59. In addition, in the example of FIG. 4, context storage unit 28 stores, as context information for the item with index number 004, that the sentence is of a Japanese language context, and that the sentence is positioned at characters 1~59.

Furthermore, it is acceptable for context storage unit 28 to store the plurality of context information with sorting by the type of context. In addition, it is acceptable for context storage unit 28 to store the plurality of context information with sorting by document order. In this way, context storage unit 28 is able to easily execute search and count.

Figure 5:
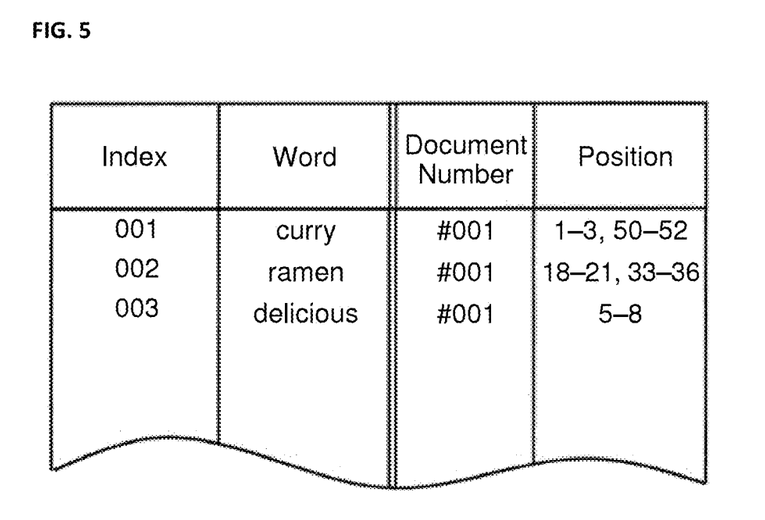
FIG. 5 shows an example of index information to be stored in an index storage unit according to an embodiment.

FIG. 5 shows an example of the index information stored in index storage unit 30 according to the embodiment. For example, index storage unit 30 stores index information for each word. For example, as the set of index information, index storage unit 30 stores an index number, a word, the document number for the document in which the word is included, and the character positions of the word. Furthermore, for a word having a plurality of appearances in a single document, index storage unit 30 stores index information that includes the plurality of character positions for the single word.

In the example of FIG. 5, as the index information for which the index number is 001, index storage unit 30 stores that the word is "curry," that the document number is #001, and that the word is positioned at characters 1~3 and at characters 50~52. In another example of FIG. 5, as the index information for which the index number is 002, index storage unit 30 stores that the word is "ramen," that the document number is #001, and that the word is positioned at characters 18~21 and at characters 33~36. Also in the example of FIG. 5, as the index information for which the index number is 003, index storage unit 30 stores that the word is "delicious," that the document number is #001, and that the word is positioned at characters 5~8.

Furthermore, it is acceptable for index storage unit 32 to store the plurality of index information with sorting by the document number order. In addition, it is acceptable for index storage unit 32 to store the plurality of index information with sorting by the character order of the words. In this way, index storage unit 30 is able to easily execute search.

Figure 6:
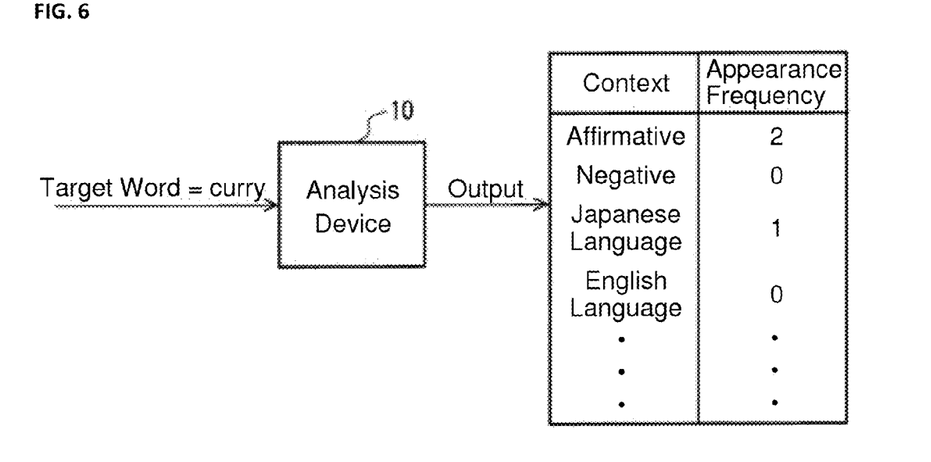
FIG. 6 shows a first example of a target word to be input to an analysis device as well as output information according to an embodiment.

FIG. 6 shows a first output example for the situation in which the document shown in FIG. 3 has been analyzed by analysis device 10. For example, when it is desirable to analyze the reputation of "curry" recorded in the document of FIG. 3 (document number=#001), the user utilizes analysis device 10 to specify document number #001 as the analysis target and to specify "curry" as the target word.

When the target word has been specified, analysis device 10 detects the position at which "curry" appears in the document having document number #001 by referencing the index information stored in index storage unit 30. In this example, as shown in FIG. 5, analysis device 10 detects the character position for two locations, which are characters 1~3 and characters 50~52.

In continuation, analysis device 10 counts, per each type of context, the context information of sentences that include the detected character positions, by referencing the context information stored in context storage unit 28.

In this example, as shown in FIG. 4, the context information of sentences that include the detected character positions (characters 1~3 and characters 50~52) includes the context information for which the index number is 001, the context information for which the index number is 003, and the context information for which the index number is 004. Based on this context information, analysis device 10 detects that the word "curry" is included in two sentences with an affirmative nuance context and that the word "curry" is included in one sentence of a Japanese language context.

Then, analysis device 10 outputs the count result for the context information, per each type of context, as the appearance frequency for the target word for each type of context. In this example, analysis device 10 outputs that the frequency at which the word "curry" appears in a sentence of an affirmative nuance context is two times, and that the frequency at which the word "curry" appears in a sentence of a Japanese language context is one time. In this way, analysis device 10 is able to notify the user that, regarding "curry" in document number #001, there is recorded a positive assessment in the Japanese language.

As described above, analysis device 10 according to an embodiment performs analysis by referencing context information formed and stored in advance. In this way, by use of analysis device 10, in response to a target word being input, there is ability to compute, within a short period of time, with what frequency and in which sentence context a target word appears.

Figure 7:
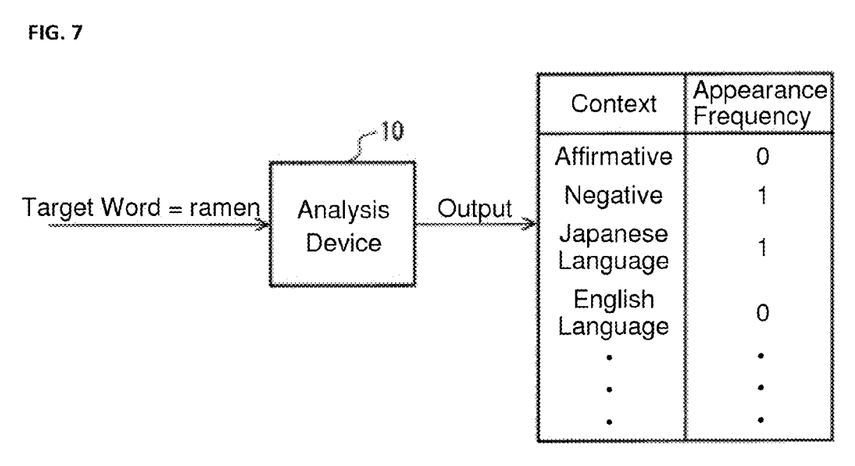
FIG. 7 shows a second example of a target word to be input to an analysis device as well as output information according to an embodiment.

FIG. 7 shows a second example of a target word that is input to analysis device 10 according to the embodiment and the resulting output information. In continuation of the analysis of the reputation of "curry" recorded in the document of FIG. 3 (document number=#001), the user wants to analyze the reputation of "ramen" recorded in the document of FIG. 3 (document number=#001). In this case, the user utilizes analysis device 10 to specify document number #001 as the analysis target and to specify "ramen" as the target word.

When the target word has been specified, analysis device 10 detects the position at which "ramen" appears in the document having document number #001 by referencing the index information stored in index storage unit 30. In this example, as shown in FIG. 5, analysis device 10 detects the character position for two locations, which are characters 8~21 and characters 33~36.

In continuation, analysis device 10 counts, per each type of context, the context information occurrences for sentences that include the detected character positions, by referencing the context information stored in context storage unit 28.

In this example, as shown in FIG. 4, the context information occurrences for sentences that include the detected character positions (characters 8~21 and characters 33~36) includes the context information for which the index number is 002 and the context information for which the index number is 004. Based on this context information, analysis device 10 detects that the word "ramen" is included in one sentence with an negative nuance context and the that the word "ramen" is included in one sentence of a Japanese language context.

Analysis device 10 outputs the count result for the context information, per each type of context, as the appearance frequency for the target word for each type of context. In this example, analysis device 10 outputs that the frequency at which the word "ramen" appears in a sentence of an negative nuance context is one time, and that the frequency at which the word "ramen" appears in a sentence of a Japanese language context is one time. In this way, analysis device 10 is able to notify the user that, regarding "ramen" in document number #001, there is recorded a poor assessment in the Japanese language.

As described above, analysis device 10 according to embodiment performs analysis by referencing the context information that is formed and stored in advance. In this way, by use of analysis device 10, even when a target word has been repeatedly input, there is ability to compute, at a minimal computing cost, with what frequency and in which sentence context a target word appears.

Figure 8:
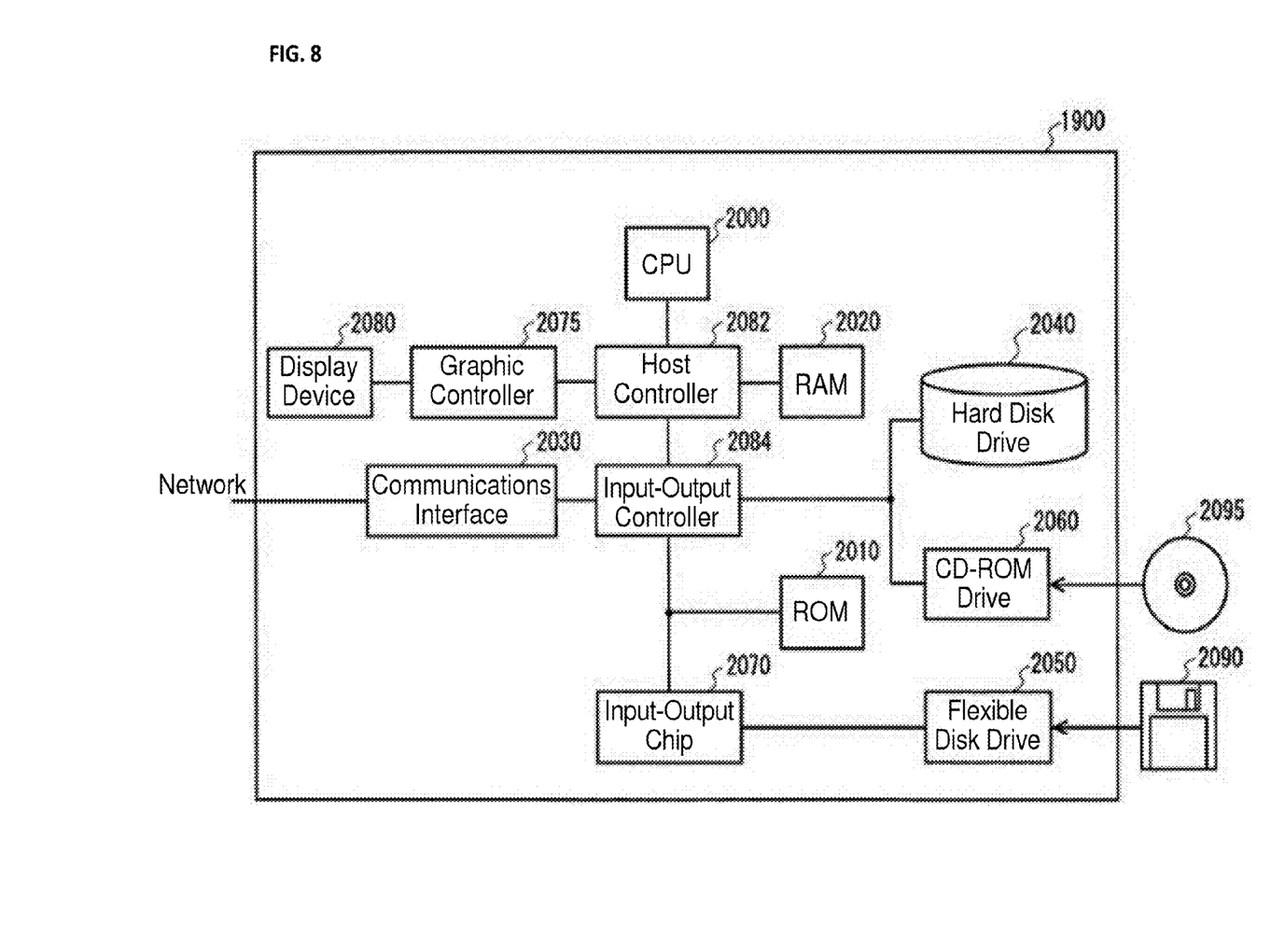
FIG. 8 shows an example of a hardware structure of a computer according to an embodiment.

FIG. 8 shows an example of the hardware structure of computer 1900 according to an embodiment. Computer 1900 according to this embodiment provides a CPU peripheral area that possesses CPU 2000 reciprocally connected to a host controller 2082, RAM 2020, graphic controller 2075, and display device 2080; it provides an input-output area that possesses communications interface 2030 connected to host controller 2082 by input-output controller 2084, hard disk drive 2040, and CD-ROM drive 2060; and, it provides a legacy input-output area that possesses ROM 2010 connected to input-output controller 2084, flexible disk drive 2050, and input-output chip 2070.

Host controller 2082 connects RAM 2020 to CPU 2000 that accesses RAM 2020 at a high transfer rate, and to graphic controller 2075. CPU 2000 operates based on programs stored in ROM 2010 and in RAM 2020, and it executes control of each component. Graphic controller 2075 acquires image data that CPU 2000 has formed in a frame buffer established in RAM 2020, and it displays the data in display device 2080. In substitution for this, it is acceptable for graphic controller 2075 to internally include a frame buffer that houses the image data created by CPU 2000.

Input-output controller 2084 connects host controller 2082 with communications interface 2030, which is an input-output device of comparatively high-speed, and with hard disk drive 2040 and CD-ROM drive 2060. Communications interface 2030 communicates with other devices through a network. Hard disk drive 2040 stores programs and data used by CPU 2000 within computer 1900. CD-ROM drive 2060 reads programs and data from CD-ROM 2095 and provides that data to hard disk drive 2040 through RAM 2020.

In addition, to input-output controller 2084, there is connected ROM 2010, flexible disk drive 2050, and input-output chip 2070, which is an input-output device of comparatively slow speed. ROM 2010 stores a boot program that executes at start of computer 1900, and/or stores programs on which the hardware of computer 1900 is dependent. Flexible disk drive 2050 reads programs or data from flexible disk 2090 and provides that data to hard disk drive 2040 through RAM 2020. Input-output chip 2070 connects flexible disk drive 2050 to input-output controller 2040, and, for example, it connects various types of input-output devices to input-output controller 2084 through such as a parallel port, serial port, keyboard port, or mouse port.

A program to be provided to hard disk drive 2040 through RAM 2020 is stored on a recording medium such as flexible disc 2090, CD-ROM 2095, or an IC card, and presented by the user. The program is read from the recording media, installed to hard disk drive 2040 of computer 1900 through RAM 2020, and executed by CPU 2000.

The program installed to computer 1900 in order to cause computer 1900 to function as analysis device 10 provides a document acquisition module, context formation module, index formation module, context storage module, index storage module, input module, position detection module, frequency detection module, and output module. These programs or modules are run by CPU 2000 and cause computer 1900 to function as respective document acquisition unit 22, context formation unit 24, index formation unit 26, context storage unit 28, index storage unit 30, input unit 32, position detection unit 34, frequency detection unit 36, and output unit 38.

By being read from computer 1900, the described information processing implemented by these programs are a specific means functioning as document acquisition unit 22, context formation unit 24, index formation unit 26, context storage unit 28, index storage unit 30, input unit 32, position detection unit 34, frequency detection unit 36, and output unit 38, which are implemented by the cooperative working of the software and each type of described hardware resource. Thus, a distinct analysis device 10 is structured according to the usage purpose, by realizing the computing and processing of information according to the usage purpose of computer 1900 in the embodiment through these specific means.

As an example, when executing communications between computer 1900 and an external device, CPU 2000 executes a communications program that has been loaded into RAM 2020, and, based on the processing content described by the communications program, communications interface 2030 is instructed for communications processing. Communications interface 2030 is controlled by CPU 2000 to read out the transmission data that has been stored in a communications buffer region established in a storage device such as hard disk drive 2040, flexible disk 2090, or CD-ROM 2095, and send this data to the network, or write the data received from the network to a reception buffer region established on the storage device. In this way, storage device communications interface 2030 can transfer transmission or reception data with the storage device using a DMA (direct memory access) method; alternatively, CPU 2000 can transfer the transmission or reception of data by reading the data from a storage device or from communications interface 2030, which is the transmission source, and then writing the data to communications interface 2030 or the storage device, which is the transmission destination.

In addition, CPU 2000 uses DMA transfer to read to RAM 2020 all or portions of a database or files stored on an external storage device, such as hard disk 2040, CD-ROM drive 2060 (CD-ROM 2095), or flexible disk drive 2050 (flexible disk 2090), and it executes each type of processing for the data on RAM 2020. Then CPU 2000 uses DMA transfer to return write the to the external storage device the data for which processing has ended. In such processing, RAM 2020 functions as that which temporarily maintains the content of the external storage device, and therefore, with this embodiment, RAM 2020 and the external storage device can be called a memory, memory component, or storage device. In this embodiment, each type of information such as programs, data, tables, or a database is stored on such a storage device and becomes the target of information processing. Furthermore, CPU 2000 maintains a portion of RAM 2020 in cache memory, and this enables reading from and writing to cache memory. In such a mode, cache memory assumes a portion of RAM 2020 functions, and, in this embodiment, except when separately shown, cache memory is included in RAM 2020, memory, and/or a storage device.

In addition, in relation to data that is read from RAM 2020, CPU 2000 performs each type of processing specified by an instruction sequence from the program, with the processing in the embodiment including each type of computation, information processing, conditional judgments, and information search and replacement, and it returns the data to RAM 2020. For example, in the case of executing conditional judgments, CPU 2000 compares each type of variable shown in the embodiment with another variable or constant, and it judges whether or not the condition has been met, such as being larger, being smaller, being higher, being lower, or being equal, and when the condition has been satisfied (or when the condition is not satisfied), it diverges to another instruction sequence or reads a subroutine.

In addition, CPU 2000 is capable of searching for information stored in a file or in a database within the storage device. For example, when a plurality of entries correspondingly listing a second attribute value relative to a first attribute value are stored in the storage device, CPU 2000 searches the entries to match the condition wherein the attribute value of the first attribute value has been specified from among the plurality of entries stored within the storage device, and it reads the attribute value of the second attribute value stored for that entry, and this enables obtaining the attribute value of the second attribute value that has been correspondingly listed for the first attribute value that meets the prescribed condition.

The program or module described above can be stored in an external recording medium. Examples of recording mediums that can be used include a flexible disk 2090, CD-ROM 2095, an optical recording medium such as a DVD or CD, an electromagnetic recording medium such as a MO, a tape medium, or a semiconductor memory such as an IC card. In addition, it is acceptable to use as a recording medium a recording device such as a hard disk or RAM established on a server system that has been connected to a dedicated communications network or the Internet, and to provide programs to computer 1900 through the network.

The above content has described this invention with reference to the embodiment, but the technical range of this invention is not limited to the range recorded by the above described embodiment. It will be clear to an appropriately skilled person that there is ability to add a variety of modifications or improvements to the above embodiment. It is clear from the recording in the Claims that such a modified or improved mode can be included within the technical scope of this invention.

The execution sequence for each of the processes such as the operations, procedures, steps, and stages in the device, system, program, and computer-implemented method shown in the Claims, Detailed Description, and Drawings, have not been delineated with a particular "before" or "preceding", and there should be exercised caution to allow a discretionary order, when there is no use of the output of a prior process by a latter process. Even though a description has been given using for convenience terms such as "first" and "next" in relation to the operational flow within the Claims, Detailed Description, and Drawings, this does not signify a necessity to execute in this order.

What is claimed is:

1. An analysis device for analyzing a text document, the analysis device comprising:

a memory having computer readable instructions; and a processor for executing the computer readable instructions, the computer readable instructions comprising:

reading the text document from an external source;

forming context information by analyzing the text document for sentences based on punctuation marks and contents of words or language in the sentences to determine a position of a character set of a predetermined context in the text document;

storing the context information to a context storage unit;

storing in an index storage unit, index information that shows a position of a word in the text document, for each word of a plurality of words contained in the text document;

inputting a target word;

detecting from the index information read from the index storage unit, a position of the target word contained in the text document;

detecting an appearance frequency of the target word per each type of context in the text document based on comparing the position of the target word with the position of the character set of the predetermined context from the context information stored in the context storage unit, and counting a quantity of context information occurrences for each type of context in the text document for the target word; and outputting the appearance frequency for each type of context in the text document for the target word based on the position of the target word and the context information.

2. The analysis device according to claim 1, further comprising:

analyzing the text document;

forming index information for each word of the plurality of words contained in the text document; and storing the formed index information in the index storage unit.

3. The analysis device according to claim 1, wherein the context information is formed for a plurality of predetermined contexts.

4. The analysis device according to claim 2, wherein the context information is formed for a plurality of predetermined contexts.

5. The analysis device according to claim 3, wherein the context information includes sections having appearing positions that overlap with each other.

6. A computer-implemented method for analyzing a text document, the computer-implemented method comprising:

reading the text document from an external source;

forming context information by analyzing the text document for sentences based on punctuation marks and contents of words or language in the sentences to determine a position of a character set of a predetermined context in the text document;

storing the context information to a context storage unit;

storing in an index storage unit, index information that shows a position of a word in the text document, for each word of a plurality of words contained in the text document;

inputting a target word;

detecting from the index information read from the index storage unit, a position of the target word contained in the text document; and detecting an appearance frequency of the target word per each type of context in the text document based on comparing the position of the target word with the position of the character set of the predetermined context from the context information stored in the context storage unit, and counting a quantity of context information occurrences for each type of context in the text document for the target word; and outputting the appearance frequency for each type of context in the text document for the target word based on the position of the target word and the context information.

7. The computer-implemented method according to claim 6, further comprising:

analyzing the text document;

forming index information for each word of the plurality of words contained in the text document; and storing the formed index information.

8. The computer-implemented method according to claim 6, wherein the context information is formed for a plurality of predetermined contexts.

9. The computer-implemented method according to claim 7, wherein the context information is formed for a plurality of predetermined contexts.

10. The computer-implemented method according to claim 8, wherein the context information includes sections having appearing positions that overlap with each other.

11. A computer program product for analyzing a text document, the computer program product comprising a computer readable non-transitory storage medium having computer readable program code embodied therewith, the computer readable program code comprising computer readable program code configured for:

reading the text document from an external source;

forming context information by analyzing the text document for sentences based on punctuation marks and contents of words or language in the sentences to determine a position of a character set of a predetermined context in the text document;

storing the context information to a context storage unit;

storing in an index storage unit, index information that shows a position of a word in the text document, for each word of a plurality of words contained in the text document;

inputting a target word;

detecting from the index information read from the index storage unit, a position of the target word contained in the text document;

detecting an appearance frequency of the target word per each type of context in the text document based on comparing the position of the target word with the position of the character set of the predetermined context from the context information stored in the context storage unit, and counting a quantity of context information occurrences for each type of context in the text document for the target word; and outputting the appearance frequency for each type of context in the text document for the target word based on the position of the target word and the context information.

12. The computer program product according to claim 11, further comprising:

analyzing the text document;

forming index information for each word of the plurality of words contained in the text document; and storing the formed index information.

13. The computer program product according to claim 11, wherein the context information is formed for a plurality of predetermined contexts.

14. The computer program product according to claim 12, wherein the context information is formed for a plurality of predetermined contexts.

15. The computer program product according to claim 13, wherein the context information includes sections having appearing positions that overlap with each other.

\* \* \* \* \*